May 29, 1923.
J. F. O'CONNOR
ANTIFRICTION BEARING
Filed May 7, 1921
1,456,997
2 Sheets-Sheet 1
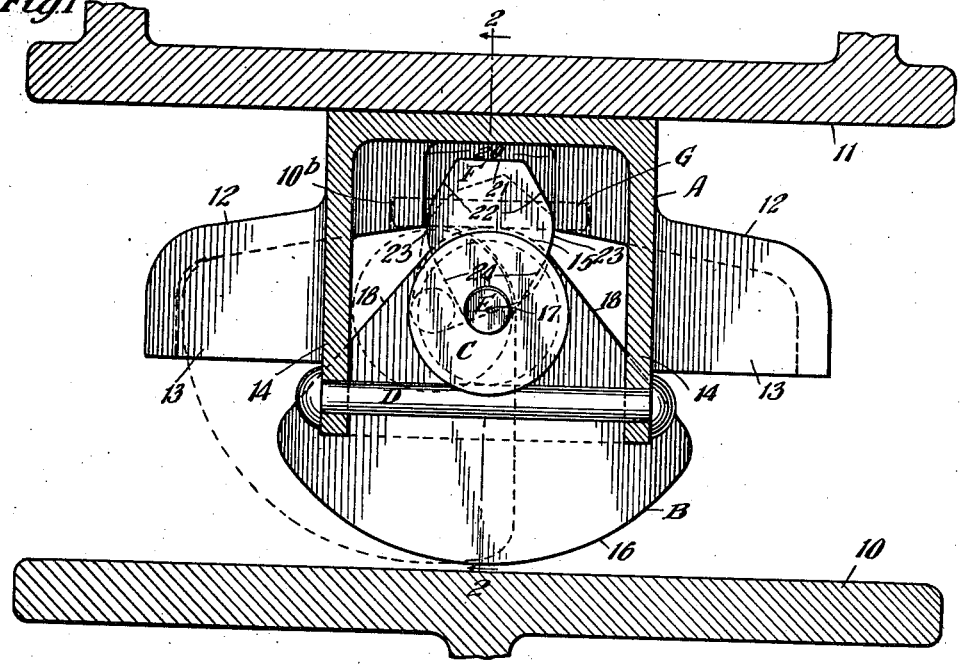
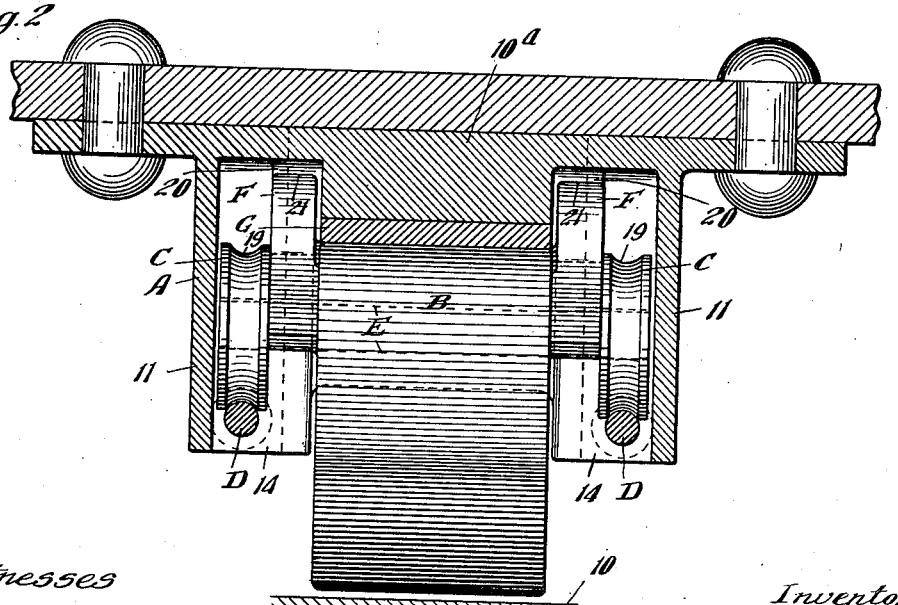
Witnesses
Wm. Geiger
Inventor
John F. O'Connor
By Geo. I. Haight
His Atty.

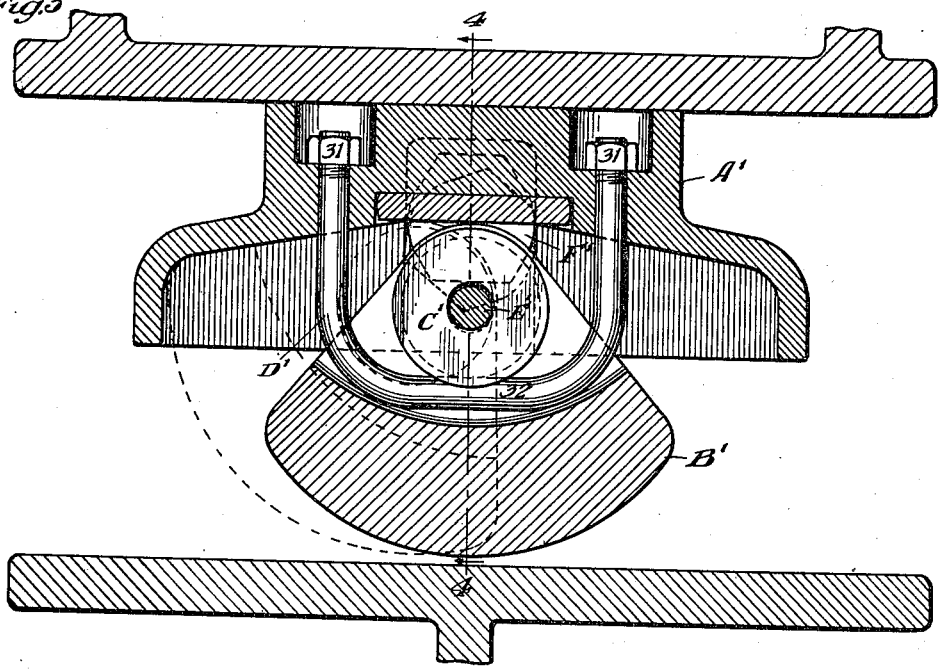
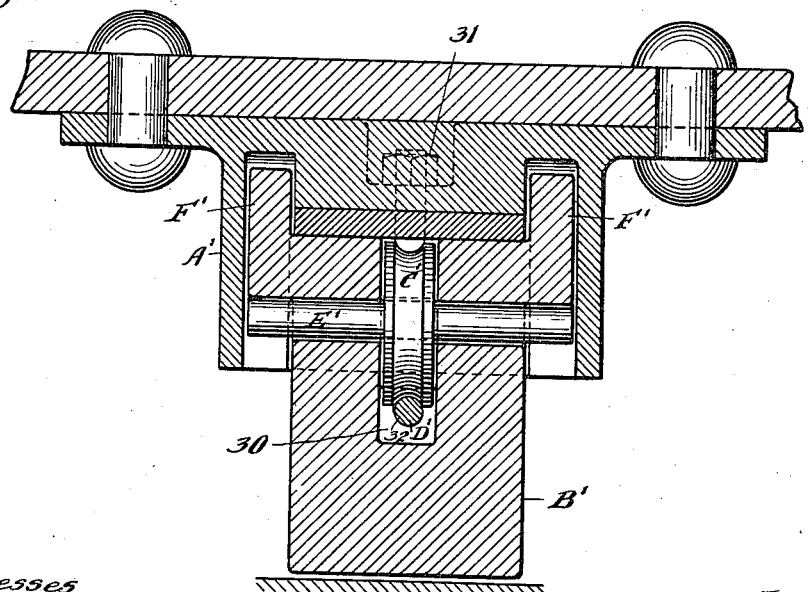

Patented May 29, 1923.

1,456,997

UNITED STATES PATENT OFFICE.

JOHN F. O'CONNOR, OF CHICAGO, ILLINOIS, ASSIGNOR TO WILLIAM H. MINER, OF CHAZY, NEW YORK.

ANTIFRICTION BEARING.

Application filed May 7, 1921. Serial No. 467,549.

*To all whom it may concern:*

Be it known that I, JOHN F. O'CONNOR, a citizen of the United States, residing at Chicago, in the county of Cook and State of Illinois, have invented a certain new and useful Improvement in Antifriction Bearings, of which the following is a full, clear, concise, and exact description, reference being had to the accompanying drawings, forming a part of this specification.

This invention relates to improvements in anti-friction bearings.

The object of the invention is to provide an efficient strong anti-friction bearing especially adapted for use as a side bearing on railroad cars, the bearing being so designed that it may be attached to the under side of a body bolster and the anti-friction element rendered self-centering under the influence of gravity and without the aid of springs and other devices likely to quickly get out of order.

In the drawings forming a part of this specification, Figure 1 is a vertical, sectional view taken parallel to the length of the railroad car and transversely of the body and truck bolsters thereof, showing my improvements in connection therewith. Figure 2 is a vertical, sectional view taken lengthwise of the bolsters and corresponding substantially to the line 2—2 of Figure 1. And Figures 3 and 4 are views similar to Figures 1 and 2 respectively but illustrating another embodiment of the invention, Figure 4 corresponding to the section line 4—4 of Figure 3.

Referring first to the construction illustrated in Figures 1 and 2, 10 denotes the upper portion of a truck bolster and 11 the under side of an opposed body bolster. As shown, the improved bearing is attached to the under side of the body bolster 11 and the bearing comprises, broadly, a housing or retaining member A; an anti-friction element proper B; a pair of rollers C—C; roller tracks D—D; a journal or axle pin E; centering lugs F—F; and an insert bearing or wear plate G.

The retaining member A is preferably in the form of a malleable casting having a top flat wall 10; centrally disposed parallel side walls 11—11; sloping top walls 12 at each end; supplemental but offset side walls 13—13 at each end; and transversely extending vertical walls 14—14 on opposite sides. Centrally of the member A, said top wall 10 is thickened as indicated at $10^a$ in Figure 2 so as to provide ample strength to sustain the compression stresses resulting when the bearing is in operation. Said thickened section $10^a$ is recessed as indicated at $10^b$ so as to accommodate the rectangular hardened wear plate G, the under side of the latter providing an upper downwardly facing bearing surface for the element B.

The anti-friction element B, as shown, is in the form of a gravity rocker of generally triangular form having an upper cylindrical bearing surface 15 and a lower cylindrical bearing surface 16, the same being struck from the same center indicated at 17 but the upper surface 15 being upon a considerably shorter radius than the radius of the surface 16. Flat surfaces 18 are formed on the element B the same extending preferably tangential to the bearing surface 15. Said flat surfaces 18 as shown best by the dotted position of the element B in Figure 1, are adapted to engage the inner faces of the sloping top walls 12 to limit the movement of the element B in either direction from central normal position.

The roller tracks D, as shown, are in the form of rivets extending horizontally and mounted at their ends in the vertical walls 14 of the member A, there being one of such track-forming rivets D on each side of the member A. Said track-forming rivets D are located below the said center 17 as shown in Figure 1.

The rollers C are two in number and of like construction, one at each side of the member B. Each of said rollers C is preferably provided with an annular peripheral groove 19 conforming to the circumference of the track-forming rivets D so that said rollers C will not slip off in their rolling movements back and forth thereon.

The rollers C are journaled on the ends of the axle or journal pin E, the latter being also extended through the element B and having its axis coinciding with the common axis of the two surfaces 15 and 16. The diameters of the rollers C are such that the upper surfaces of the rollers C are normally disposed slightly below the level of the bearing surface 15, as shown in Figure 1.

On the interior of the retaining member A, near the top thereof and on each side, is provided a vertically extending guideway indicated at 20, said guideways 20 being on the outer side of the bearing plate G. The lugs F work within said guide recesses 20, the lugs F being preferably formed integrally with the anti-friction element B and extending upwardly above the surface 15. Each of said lugs F has a top flat edge 21, downwardly diverging edges 22—22 merging into rounded portions 23—23 from which extend downwardly converging edges 24—24. The contours of the edges of the lugs F are so made that, in any angular position of the anti-friction element B, the distance across said lug taken horizontally in line with the points on the vertically extending faces of the guide grooves 20 in contact with said lug or the nearest thereto, will always substantially equal the horizontal width of the guide grooves 20. With this arrangement, the anti-friction element B is free to roll on the plate G back and forth without interference from the lugs F but the lugs F positively prevent the element B from being shifted bodily without rolling, relatively to the member B. In other words, whenever the element B rocks during its return movement, it necessarily returns to central normal position.

From the preceding description it will be observed that the element B is supported through the pin E on the rollers C. Consequently, at the end of any movement and upon removal of the actuating pressure, the weight of the element B is transferred to the rollers C and the latter are rolled back to their central normal position under the influence of the element B which swings downwardly about the pin E as a center, under the influence of gravity.

In the construction illustrated in Figures 3 and 4, the general arrangement of parts is the same as shown in Figures 1 and 2. In the form shown in Figures 3 and 4, however, only one roller C′ is employed, the same being located centrally of the anti-friction element B′. The latter is centrally slotted as indicated at 30 to accommodate said roller C′ and also the roller track-forming member D′. The latter is in the form of a U-bolt, the upper ends of the arms of which are secured to the retaining member A′ by nuts 31—31. The U-bolt D′ provides a lower horizontally extending track portion 32 upon which the roller D′ is adapted to roll back and forth. The slot 30 within the element B′ is made large enough so as to avoid any interference with the bolt D′ when the element B′ rocks back and forth. A journal or axle pin E′ is extended through the roller C′ and the element B′ so as to transfer the weight of the latter to the roller. Centering lugs F′, which are formed on the element B′, cooperate with corresponding guide grooves in the retaining member A′ the same as in the case of the construction shown in Figures 1 and 2.

Although I have herein shown and described what I now consider the preferred manner of carrying out the invention, the same is merely illustrative and I contemplate all changes and modifications that come within the scope of the claims appended hereto.

I claim:

1. In an anti-friction bearing, the combination with a retaining member adapted to be secured to the under side of a body bolster or the like, said member being provided with a downwardly facing bearing surafce; of an anti-friction element, having upper and lower rounded bearing surfaces and adapted to roll on said bearing surface of the retaining member, said element being so designed that the center of weight thereof is elevated when rolled to either side of normal position; a roller-track carried by said member; a roller supported on said track; means for supporting said element from a point above its center of weight on said roller; and cooperating means on said member and element arranged to prevent bodily shifting of said element with respect to said member but permitting free rolling movement thereof, said means on said element being independent of said roller.

2. In an anti-friction bearing of the character described, the combination with a retaining member adapted to be secured to the under side of a body bolster or the like, said member being provided with a bearing surface on the interior thereof; of an anti-friction rocker element having concentric upper and lower bearing surfaces struck on radii of different length, the upper bearing surface corresponding to the shorter radius whereby said element has the center of weight thereof disposed below said common center and is adapted to be elevated when the rocker is rolled to either side of normal position; a horizontally extending roller-track carried by said member; a roller adapted to roll back and forth on said track; means for supporting said element on said roller; and cooperating means on said member and element arranged to prevent bodily shifting of said element with respect to said member but permitting free rolling movement of said element with respect to said member.

3. In an anti-friction bearing of the character described, the combination with a retaining member adapted to be secured to the under side of a body bolster or the like and provided on its under side with a horizontally extending bearing surface; of an anti-friction rocker element having upper and lower concentric bearing surfaces of different radii, the upper bearing surface corresponding to the shorter radius; a journal carried by said rocker element and having its axis coinciding with the axis of said concentric surfaces; a horizontally extending roller track carried by said member and located below said journal; a supporting roller mounted on said track and said journal; and cooperating means on said rocker element and said member to insure centering of said rocker element relatively to said member upon return of said element after the same has been actuated.

4. In an anti-friction bearing, the combination with a retaining member adapted to be secured to the under side of a body bolster or the like, said member being provided with a downwardly facing bearing surface; of an anti-friction element having upper and lower rounded bearing surfaces and adapted to roll on said bearing surface of the retaining member, said element being so designed that the center of weight thereof is elevated when rolled to either side of normal position; a roller-track carried by said member; a roller rotatably journaled on said element and supported on said track; means for supporting said element from a point above its center of weight on said roller; and cooperating means on said member and element arranged to prevent bodily shifting of said element with respect to said member but permitting free rolling movement thereof, said means including, guide grooves provided in said member and lugs rigid with said element extending within said grooves.

5. In an anti-friction bearing of the character described, the combination with a retaining member adapted to be secured to the under side of a body bolster or the like and provided on its under side with a horizontally extending bearing surface; of an anti-friction rocker element having upper and lower concentric bearing surfaces of different radii, the upper bearing surface corresponding to the shorter radius; a journal carried by said rocker element and having its axis coinciding with the axis of said concentric surfaces; a horizontally extending roller-track carried by said member and located below said journal; a supporting roller mounted on said track and said journal; and cooperating means on said rocker element and said member to insure centering of said rocker element relatively to said member upon return of said element after the same has been actuated, said means including, guide grooves provided in said member and lugs rigid with said element extending within said grooves.

6. In an anti-friction bearing of the character described, the combination with a retaining casting adapted to be secured to the under side of a body bolster or the like, said casting having a horizontally extending bearing surface on the interior thereof and provided with vertically extending guide grooves on each side thereof, said casting having also depending walls on each side and horizontally extending roller-track elements carried by said depending walls; of an anti-friction rocker having concentric upper and lower bearing surfaces, the upper surface being struck on a radius shorter than the lower bearing surface and the center of weight of the rocker being disposed below the common center of said surfaces; of guide lugs on each side of said rocker rigid therewith and cooperating with said guide grooves to prevent bodily shifting of said rocker with respect to the casting; a journal pin extending through said rocker and having its ends projecting therefrom; and rollers mounted one on each end of said journal pin, said rollers being supported on said track elements, the centers of said rollers coinciding with the common center of said bearing surfaces.

In witness that I claim the foregoing I have hereunto subscribed my name this 29th day of April, 1921.

JOHN F. O'CONNOR.

Witnesses:
 CARRIE GAILING,
 ANN BAKER.